June 10, 1958     D. L. MOCK     2,838,699
WIDE-BAND VIBRATION DAMPER
Filed March 20, 1957

INVENTOR
DANA L. MOCK

BY
W. E. Thibodeau, T. J. Lynch, F. E. McGee & J. D. Edgerton

United States Patent Office 2,838,699
Patented June 10, 1958

2,838,699
WIDE-BAND VIBRATION DAMPER

Dana L. Mock, Falls Church, Va., assignor to the United States of America as represented by the Secretary of the Army Application March 20, 1957, Serial No. 647,458

3 Claims. (Cl. 310—26)

This invention relates to vibration dampers and more particularly to wide-band vibration dampers.

An object of this invention is a damper device reliable over a range or band of frequencies instead of a fixed frequency.

Another object of this invention is a device to dampen compressional waves in solid or hollow bodies.

Resonances in magnetostrictive transducers may be viewed as being caused by wave reflections at boundaries. These reflections are undesirable and can be avoided if means is provided to dissipate the energy of the incident wave.

This invention is a mechanical device which is attached to a vibrating solid or hollow body to dampen compressional waves by means of friction between an extension to the vibrating body and a soft wire wrapped around the extension. This invention has proven to be more efficient than springs, clamps, rubber pads, etc., and to provide vibration damping over a wide band of frequencies.

The specific nature of the invention as well as other objects, uses and advantages thereof will clearly appear from the following description and from the accompanying drawing, in which.

Figure 1:
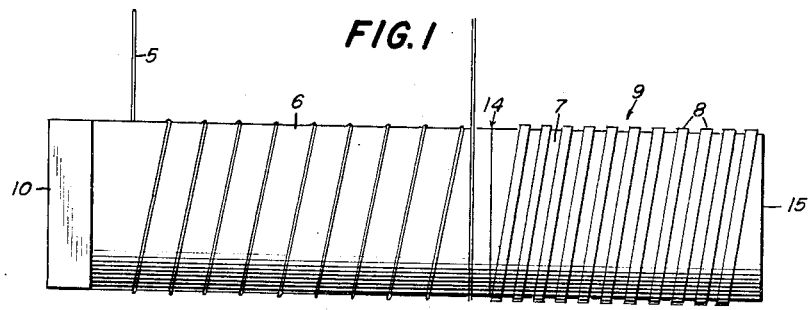
Figure 1 is a schematic view showing a general arrangement of components of a magnetostrictive transducer with a damper attached.

In Figure 1, in accordance with the theory of magnetostriction, a current in coil 5 causes nickel tube 6 to contract in length. When the current in coil 5 has a frequency of 10,000 cycles per second, for example, the nickel tube 6 will vibrate 10,000 cycles per second and will impart this vibration to a test specimen 10 which is attached to said tube 6. The amount of displacement or peak acceleration which the test specimen 10 will be subjected to is a function of the length of tube 6. A lead extension tube 7 is affixed to tube 6 in such a manner that a substantially non-reflecting junction 14 is obtained; this is readily accomplished by soldering.

Figure 2:
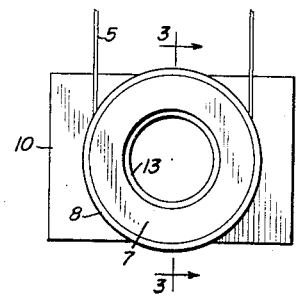
Figure 2 is an end view as seen from the damper end.
Figure 3:
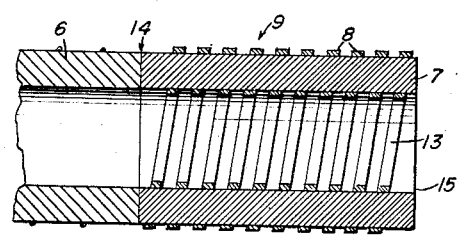
Figure 3 is a sectional view along the line 3—3 of Figure 2 in the general area of the junction of the damper with the magnetostrictive transducer.

In Figures 2 and 3, the lead tube 7 is shown with a soft lead wire 8 wrapped around the exterior periphery of said extension tube 7. Another soft lead wire 13 is helically wound and placed in contact with the inner periphery of tube 7. Compressional waves in the tube 6 reflect off the test specimen 10 and travel in tube 6 to the damper 9 comprising tube 7, wire 8, and wire 13. The non-reflecting junction 14 allows the waves to pass from tube 6 to tube 7. The waves are partially dampened while passing through the lead tube 7 by the damping characteristic of lead. Additional energy of the wave is dissipated overcoming the friction between tube 7 and the soft lead wires 8 and 13. The attenuated wave reaching end 15 of tube 7 is reflected toward tube 6. The same forces act on the wave during its return trip and cause the wave to be further reduced in amplitude so that negligible energy is returned to tube 6.

The efficiency of the damper increases with increases in length of tube 7 and number of coils of lead wires 8 and 13. Solid rods may be substituted for tubes 6 and 7.

It will be apparent that the embodiments shown are only exemplary and that various modifications can be made in construction and arrangement within the scope of the invention as defined in the appended claims.

I claim:

1. A tubular magnetostrictive transducer, a tubular lead extension affixed to said transducer by a non-reflecting junction, and lead wire wrapped around the inner and outer periphery of said extension, said lead wire providing the friction to attenuate compressional wave from said transducer in combination with the inherent damping effect of lead.

2. The invention in accordance with claim 1, wherein the lead wire is helically wrapped around the inner and outer periphery of said extension.

3. The invention in accordance with claim 1, wherein said transducer is comprised of a nickel tube and a coil surrounding said nickel tube, said coil causing said nickel tube to vibrate by magnetostrictive action when cyclic current is applied to said coil.

References Cited in the file of this patent

UNITED STATES PATENTS

| 2,461,543 | Gunn | Feb. 15, 1949 |
| 2,647,949 | Burns | Aug. 4, 1953 |